(12) United States Patent
Murzyn et al.

(10) Patent No.: US 12,372,709 B2
(45) Date of Patent: Jul. 29, 2025

(54) DISPLAY BACKLIGHT FOR AVOIDING WINDSHIELD REFLECTIONS

(71) Applicant: VISTEON GLOBAL TECHNOLOGIES, INC., Van Buren Township, MI (US)

(72) Inventors: Pawel Murzyn, Chelmsford (GB); James Arthur Carpenter, Eagle, MI (US); Paul Fredrick Luther Weindorf, Novi, MI (US)

(73) Assignee: Visteon Global Technologies, Inc., Van Buren Township, MI (US)

( * ) Notice: Subject to any disclaimer, the term of this patent is extended or adjusted under 35 U.S.C. 154(b) by 0 days.

(21) Appl. No.: 18/427,810

(22) Filed: Jan. 30, 2024

(65) Prior Publication Data

US 2024/0255690 A1    Aug. 1, 2024

Related U.S. Application Data (60) Provisional application No. 63/482,452, filed on Jan. 31, 2023.

(51) Int. Cl.
*F21V 8/00* (2006.01)

(52) U.S. Cl.
CPC ......... *G02B 6/0055* (2013.01); *G02B 6/0053* (2013.01)

(58) Field of Classification Search
CPC .......................... G02B 6/0055; G02B 6/0053
See application file for complete search history.

(56) References Cited

U.S. PATENT DOCUMENTS

| | | | |
|---|---|---|---|
| 11,933,978 B2 * | 3/2024 | Amarilio | G02B 5/0231 |
| 2002/0149924 A1 * | 10/2002 | Falicoff | G02B 27/0977 |
| | | | 362/19 |
| 2010/0014313 A1 | 1/2010 | Tillin et al. | |
| 2011/0109528 A1 * | 5/2011 | Mun | G02B 27/0172 |
| | | | 345/87 |
| 2015/0355403 A1 * | 12/2015 | Santori | G02B 5/1819 |
| | | | 362/606 |
| 2018/0164489 A1 * | 6/2018 | Fattal | G02B 19/0047 |
| 2019/0250461 A1 | 8/2019 | Andreev et al. | |
| 2019/0346615 A1 * | 11/2019 | Johnson | G02B 6/0051 |
| 2022/0231479 A1 | 7/2022 | Raring et al. | |

* cited by examiner

*Primary Examiner* — Evan P Dzierzynski (74) *Attorney, Agent, or Firm* — Quinn IP Law (57) ABSTRACT

A system for backlighting a display to avoid producing a reflection. The system may include a light source configured for generating a light, a collimated lightguide configured for collimating the light to a collimated light, and a direction changing element configured for directing the collimated light to a vertically narrow light operable to avoid producing reflections.

19 Claims, 6 Drawing Sheets

DISPLAY BACKLIGHT FOR AVOIDING WINDSHIELD REFLECTIONS

CROSS REFERENCE TO RELATED APPLICATIONS

This application claims the benefit of U.S. Provisional Application No. 63/482,452, filed Jan. 31, 2023, which is hereby incorporated by reference in its entirety.

INTRODUCTION

The present disclosure relates to backlights and backlighting systems configured for backlighting displays, such as but not necessarily limited to systems for backlighting a display to avoid producing a reflection in a windshield of a vehicle.

A visual type of display may be electronically configured to present images, text, video, and/or media to one or more viewers, such as in response to electrical signals provided thereto from an electronic device configured to interact with the viewers or to otherwise receive data, information, and other material desired for presentation. A wide variety of electronic devices may include such displays, with the displays typically being configured with various shapes and sizes and with varying luminance profiles depending on an intended environment of use. In the case of vehicles, such as but not necessarily limited to automobiles, one or more displays may be configured to exchange media with an operator and/or one or more occupants of the vehicle. Some vehicles may include a windshield, a windscreen, a window, or other surface or structure in proximity to a display. The display may be included within a dashboard, an instrument panel, an infotainment system, a control panel, a facia, or other portion of the vehicle below the windshield or proximate to another vehicle surface.

It may be undesirable for light emitted from a display to reflect off the windshield or the other vehicle surfaces. To combat such reflections, some vehicles in the past have included blocking elements, shutters, obstructions, louvers, or other physical infrastructure in proximity to or as part of the display to prevent light emitted therefrom from reflecting off of the windshield, etc. The blocking features may be disadvantageous due to their cost and/or due to the blocked, louvered, etc. light being wasted or otherwise unusable, which may result in the display having to be driven with more power or with less efficiency.

SUMMARY

One aspect of the present disclosure relates to a system for backlighting a display to avoid producing a reflection in a windshield of a vehicle. The system may include a backlight configured for providing vertically narrow light operable with the display to interface media with one or more viewers in a manner that avoids producing reflections in the windshield or other surfaces of the vehicle. The backlight may include a plurality of prisms configured for emitting the vertically narrow light to the display in a manner that minimizes wasted and/or unusable light and in a manner that minimizes power consumption and maximizes power efficiency.

One aspect of the present disclosure relates to a backlighting system for preventing a display from producing windshield reflections within a vehicle when the windshield reflections result from the display emitting an optical signal at a vertical angle greater than a reflection angle. The backlighting system may include an edge light source configured for generating an edge light, a collimated lightguide configured for collimating the edge light to a collimated light, and a direction changing element statically configured for directing the collimated light to a vertically narrow light having a vertical cutoff angle less than the reflection angle such that the vertically narrow light may be operable with the display to produce the optical signal without the windshield reflections.

The direction changing element may include a plurality of prisms configured for directing the collimated light to the vertically narrow light.

The prisms may be triangular in shape and include a receiving face configured for receiving the collimated light, a reflecting face configured for reflecting the collimated light received from the receiving face, and an output face configured for emitting the vertically narrow light towards the display.

The direction changing element may be comprised of an optically transparent material.

The prisms may be immovably attached to or included as part of a base of the direction changing element.

The receiving face may be configured for refracting the collimated light prior to the collimated light reaching the reflecting face.

The receiving face may be angled at a receiving angle defined relative to a normal of the display, and the reflecting face may be angled at a reflecting angle. The receiving face may cooperate with the reflecting face to constrain the vertically narrow light to an output angle less than the reflection angle.

The collimated lightguide may be configured for emitting the collimated light at a collimated angle substantially across an entirety of an output surface thereof. The output surface of the collimated lightguide may be parallel to the display and perpendicular to the normal. A surface area of the output surface may be greater than a surface area of an input to the collimated lightguide receiving the edge light.

A diffuser may be disposed between the direction changing element and the display, optionally with the diffuser configured for spreading the vertically narrow light to a spread light to provide uniformity improvement.

The vertical narrow light may be operable with the display to emit the optical signal with a vertical luminance profile less than a horizontal luminance profile.

The direction changing element may be comprised of an optically transparent material having a textured or shaped surface configured for directing the collimated light in a fixed manner toward the display without physically blocking the collimated light from passing therethrough.

One aspect of the present disclosure relates to a backlighting system for a display. The backlighting system may include an edge light source configured for generating an edge light, a collimated lightguide configured for collimating the edge light to a collimated light, and a plurality of triangularly shape prisms statically configured for directing the collimated light to a vertically narrow light, with the prisms configured to emit the vertically narrow light at a vertical cutoff angle defined relative to a normal of the display.

The prisms may include a receiving face configured for receiving the collimated light, a reflecting face configured for reflecting the collimated light received from the receiving face, and an output face configured for emitting the vertically narrow light towards the display.

The direction changing element may be comprised of an optically transparent material configured for directing the collimated light in a fixed manner toward the display without physically blocking the collimated light from passing therethrough.

One aspect of the present disclosure relates to a vehicle. The vehicle may include a windshield, a display disposed rearward and below at least a portion of the windshield, the display producing windshield reflections when emitting an optical signal at a vertical angle greater than a reflection angle, and a backlight system configured for preventing the display from producing the windshield reflections. The backlighting system may include a collimated lightguide configured for collimating an input light to a collimated light and an optically transparent direction changing element configured for statically directing the collimated light to a vertically narrow light having a vertical cutoff angle less than the reflection angle, with the vertically narrow light being operable with the display to produce the optical signal without the windshield reflections.

The direction changing element may include a textured or shaped surface configured for statically directing the collimated light in a fixed manner toward the display without physically blocking the collimated light from passing therethrough.

The direction changing element may include a plurality of prisms configured for statically directing the collimated light in a fixed manner toward the display without physically blocking the collimated light from passing therethrough.

The above features and advantages along with other features and advantages of the present teachings are readily apparent from the following detailed description of the modes for carrying out the present teachings when taken in connection with the accompanying drawings. It should be understood that even though the following Figures and embodiments may be separately described, single features thereof may be combined to additional embodiments.

BRIEF DESCRIPTION OF THE DRAWINGS

The accompanying drawings, which are incorporated into and constitute a part of this specification, illustrate implementations of the disclosure and together with the description, serve to explain the principles of the disclosure.

DETAILED DESCRIPTION

As required, detailed embodiments of the present disclosure are disclosed herein; however, it is to be understood that the disclosed embodiments are merely exemplary of the disclosure that may be embodied in various and alternative forms. The figures are not necessarily to scale; some features may be exaggerated or minimized to show details of particular components. Therefore, specific structural and functional details disclosed herein are not to be interpreted as limiting, but merely as a representative basis for teaching one skilled in the art to variously employ the present disclosure.

Figure 1:
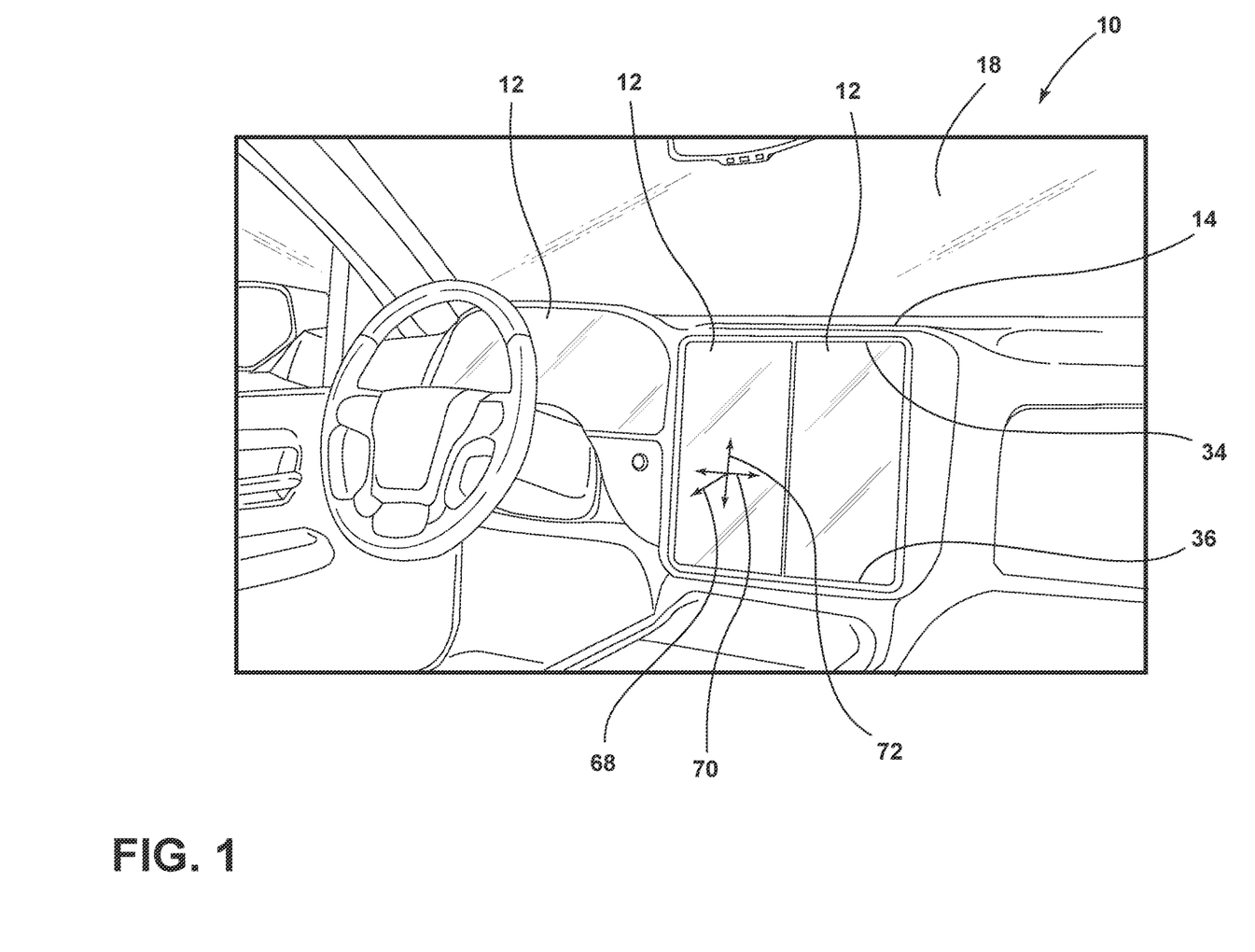
FIG. 1 illustrates a partial perspective view of a vehicle having a plurality of displays backlit in accordance with one non-limiting aspect of the present disclosure.

FIG. 1 illustrates a partial perspective view of a vehicle 10 having a plurality of displays 12 backlit in accordance with one non-limiting aspect of the present disclosure. The vehicle 10 is shown for non-limiting purposes as being an automobile having the displays 12 disposed within a dashboard 14 to demonstrate an advantageous capability of the present disclosure to backlight the displays 12 in a manner that avoids or minimizes producing a reflection in a windshield 18, which may be referred to as windshield reflections. The present disclosure is predominantly described with respect to avoiding reflections in the windshield 18 for non-limiting purposes due to such reflections typically being undesirable to a driver, other vehicle occupants, and/or other vehicles. One having ordinary skill in the art will readily recognize the backlighting capabilities of the present disclosure being beneficial in illuminating displays 12 in a wide variety of applications, including backlighting the displays 12 to avoid reflections in a windscreen, a window, or other surface or structure (not shown) of the vehicle.

The present disclosure is described with respect to avoiding windshield reflections for non-limiting purposes and to highlight one use of the contemplated backlighting that may be particularly beneficial with vehicles having one or more displays 12 in proximity to the windshield 18, such as rearward and below of portion of the windshield 18 in the illustrated manner. The vehicle 10 may optionally include multiple displays 12 arranged in a pillar-to-pillar or edge-to-edge configuration relative to the windshield 18 such that the displays 12 may stretch from side to side across the dashboard 14. The displays 12 may be configured to display images and other media associated with an instrument panel, an infotainment system, a control panel, or other aspect of the vehicle 10. The vehicle 10 is described for non-limiting purposes as being an automobile, as the present disclosure fully contemplates utilizing the backlighting for other types of displays 12 and display arrangements, including those found in trucks, motorcycles, watercraft, trains, and/or aircraft and/or as part of a stationary object, such as but not limited to, billboards, kiosks and/or marquees.

Figure 2:
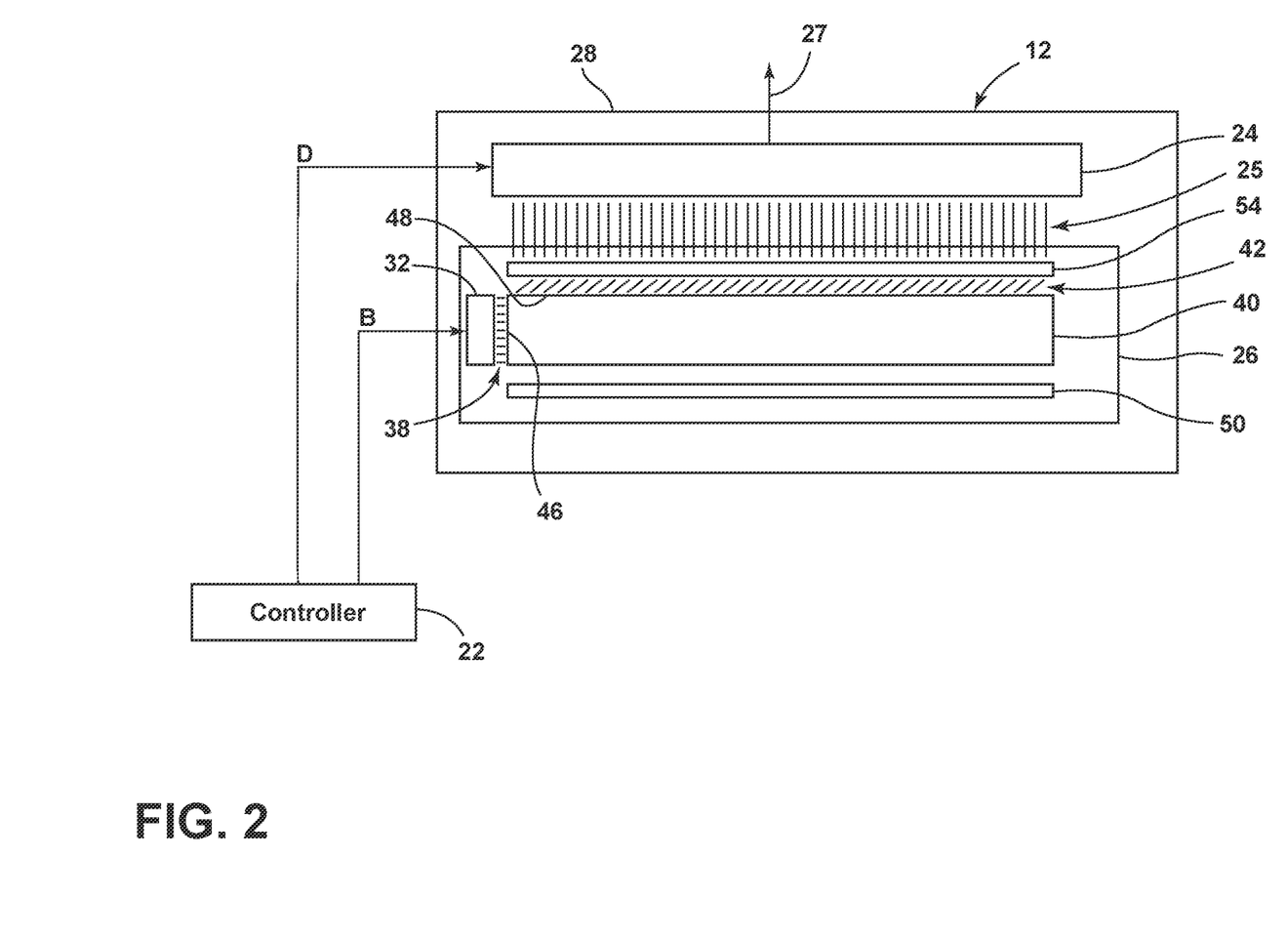
FIG. 2 illustrates a schematic diagram of a display in accordance with one non-limiting aspect of the present disclosure.

FIG. 2 illustrates a schematic diagram of the display 12 in accordance with one non-limiting aspect of the present disclosure. The display 12 may be electrically connected to a controller circuit 22 and may include a transmissive display screen or element 24 disposed relative to a backlight 26. An optical signal 27 may be presented from a surface 28 of the display 12 to convey visible images, data, information, words, numbers, pictures, graphical shapes, video, information, and other media, such as video (e.g., a rear-view camera video, a forward-view camera video, an on-board DVD player, etc.). A display signal (e.g., D) may be generated by the controller circuit 22 and received by the transmissive display element 24, which for example may be used to provide instrumentation (e.g. speed, tachometer, fuel, temperature, etc.) for presentation therewith. The display signal D may carry information used by the transmissive display element 24 to modulate the optical signal 27. The controller circuit 22 may be configured to generate a brightness signal (e.g., B) for controlling the backlight 26.

The controller circuit 22 may be configured to implement an electronic control for generating the display information in the display signal D. The controller circuit 22 may generate and present brightness, luminance, and other information in the brightness signal B.

The controller circuit 22 may include one or more microcontrollers. Each microcontroller may optionally include one or more processors, each of which may be embodied as a separate processor, an Application Specific Integrated Circuit (ASIC), a Field Programmable Gate Array (FPGA), or a dedicated electronic control unit. The microcontrollers may be a sort of electronic processor (implemented in hardware, software executing on hardware, or a combination of both), which may also include tangible, non-transitory memory, (e.g., read only memory in the form of optical, magnetic, and/or flash memory). The microcontrollers may include application-suitable amounts of random-access memory, read-only memory, flash memory and other types of electrically erasable programmable read-only memory, as well as accompanying hardware in the form of a high-speed clock or timer, analog-to-digital and digital-to-analog circuitry, and input/output circuitry and devices, as well as appropriate signal conditioning and buffer circuitry. Computer-readable and executable instructions embodying the present disclosure may be stored in the memory and executed as set forth herein. The executable instructions may be a series of non-transitory instructions employed to run applications on the microcontrollers (either in the foreground or background). The microcontrollers may receive commands and information, such as in the form of one or more input signals from various controls or components, and control to the transmissive element 24 according to one or more control signals transferred to the display 12.

The transmissive display element 24 may be configured to implement a display panel that modulates a vertically narrow light 25 emitted from the backlight 26 as the vertically narrow light 25 passes through from one side of the transmissive display element 24 to the other side. The transmissive display element 24 may be a color transmissive display element 24 or a black-and-white transmissive display element 24. The transmissive display element 24 may be mounted adjacent to (or adjoining) the backlight 26. The transmissive display element 24 may be generally operational to change opaqueness, color, luminance, etc. in different areas and in response to the display signal D, optionally with the changes generally modulating the intensity and the color to generate the optical signal 27. The modulated light 24=5 may form the images in the optical signal 27. In various embodiments, the transmissive display element 24 may 24 may be implemented as a thin-film transistor (TFT) liquid crystal display (LCD) or a passive liquid crystal display. Other transmissive display element 24 technologies may be implemented to meet the design criteria of a particular application.

The backlight 26 may include an edge light source 32 configured for generating an edge light 38. The edge light source 32 may be disposed on the edge of the display 12, such as along a top edge 34 or a bottom edge 36 (see FIG. 1). The backlight 26 is predominantly described with respect to including the edge lighting source 32 due the advantages associated with edge-backlit displays 12 tending to be lower cost and/or better performing, particularly when used with larger displays 12, such as edge-to-edge or pillar-to-pillar display types, instrument panel displays, etc., at least with respect to more expensive full array local dimming (FALD) backlight 26 configurations. This is done for non-limiting purposes as the present disclosure fully contemplates a source of light for the backlight 26 originating from an array or other non-edge-type of light source. The backlight 26 may include a collimated lightguide 40 configured for collimating the edge light 38 to a collimated light 42. The collimated lightguide 40 may be configured to receive the edge light 38 at an input 46 and to direct the corresponding collimated light 42 out of an output 48, optionally with the collimated light 42 being equally or consistently collimated across substantially an entire surface of the output 48. The surface area of output 48 may be greater than a surface area of the input 46. The collimated lightguide 40 may be comprised of an optically transparent material or otherwise configured to collimate the edge light 38 in the contemplated manner.

Figure 3:
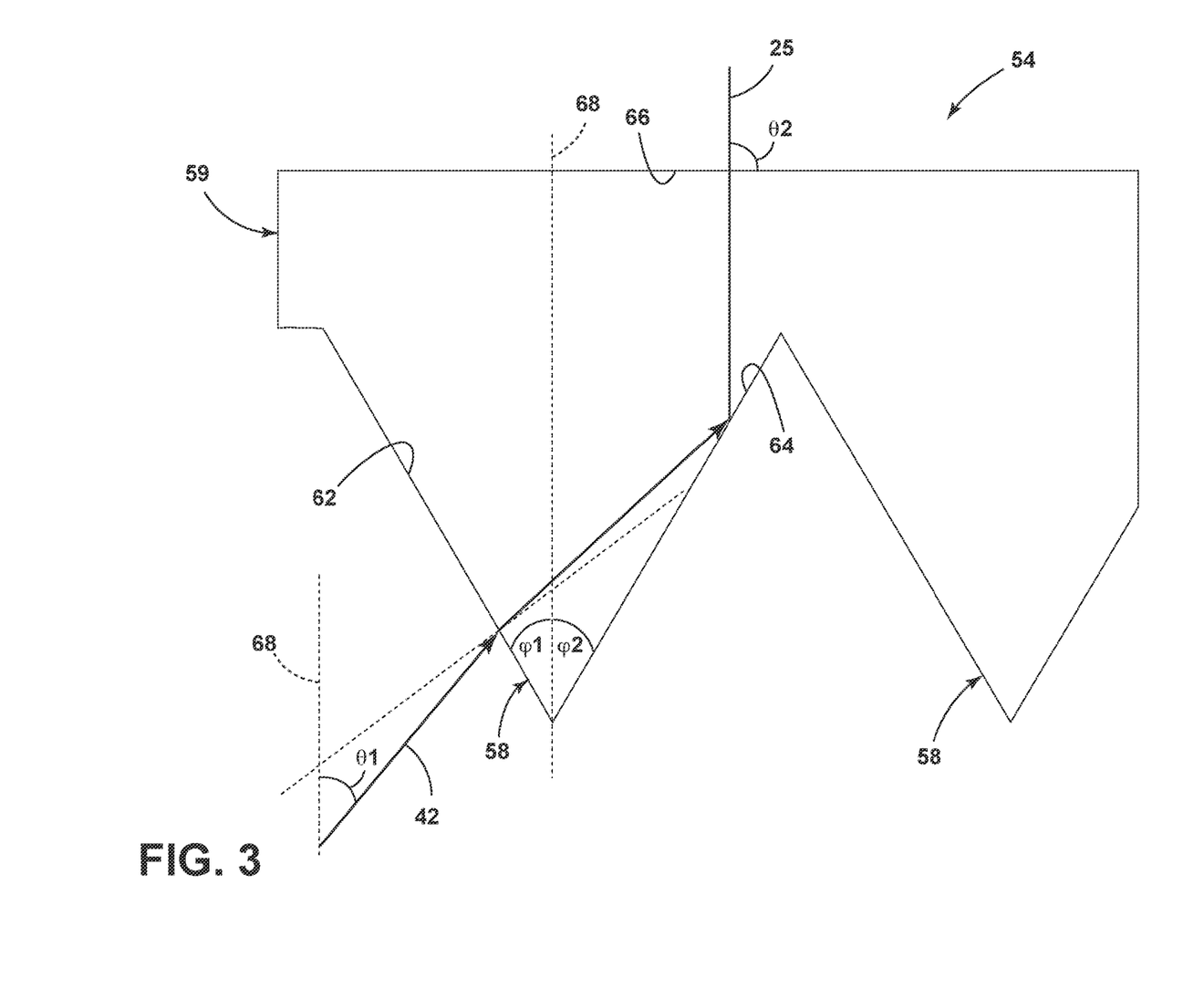
FIG. 3 illustrates a schematic diagram of a direction changing element in accordance with one non-limiting aspect of the present disclosure.

The backlight 26 may optionally include a reflector film 50 disposed below the collimated lightguide 40. The reflector film 50 may be configured to recycle the edge light 38, the collimated light 42, and any reflected light, such as by re-directing the corresponding light to the collimated lightguide 40. The collimated light 42 output from the collimated lightguide 40 may be emitted toward a direction changing element 54 configured for directing the collimated light 42 into the vertically narrow light 25, i.e., the light contemplated herein to facilitate illuminating the transmissive display element 24 in a manner that avoids producing reflections within the windshield 18. FIG. 3 illustrates a schematic diagram of the direction changing element 54 including a plurality of prisms 58 configured for providing a shaped or textured surface operable for directing the collimated light 42 to the vertically narrow light 25. The direction changing element 54 may be comprised of or include the prisms 58, which may be triangularly shaped prisms 58, arranged in a fixed configuration to statically direct the collimated light 42 to the vertically narrow light 25. The orientation and relation of the prisms 58 may be design parameter incapable of being changed once applied to a base 59, which may be a layer or other supporting structure, of the direction changing element 54.

The direction changing element 54 may be comprised of an optically transparent material, such as film or other structure having the prisms 58 coated, ground, adhered, or otherwise fashioned thereon. The triangular shaped prisms 58 are presented for non-limiting purposes as the present disclosure fully contemplates other geometries being suitable for similarly directing the collimated light 42 to the vertically narrow light 25. The prism 58 geometries may be shaped with a receiving face 62, a reflecting face 64, and an output face 66. The receiving face 62 may be configured for refracting or otherwise conveying the collimated light 42, the receiving face 64 may be configured for reflecting the collimated light 42 to the vertically narrow light 25, and the output face 66 may be configured for emitting the vertically narrow light 25 toward the transmissive display element 24. The receiving face 64 may be configured to provide an angle of incidence for the collimated light 42 sufficient for constraining the vertically narrow light 25. A receiving angle ($\varphi 1$) of the receiving face 62 and a reflecting angle ($\varphi 2$) of the reflecting face 64 may be defined relative to a normal 68 of the display 12, with the receiving and reflecting angles $\varphi 1$, $\varphi 2$ shown to be equal for non-limiting purposes.

The collimated lightguide 40 may be configured to direct the collimated light 42 toward the prisms 58 at a collimated angle ($\theta 1$), which may optionally be consistent or uniform throughout the surface area of the collimated lightguide output 48. The collimated angle $\theta 1$ may be defined relative to the normal 68 such that the collimated angle $\theta 1$ in the exemplary embodiment may be greater than an output angle ($\theta 2$) defined relative to the normal 68 for the vertically narrow light 25 output toward the transmissive display element 24. The output angle θ2 of the vertically narrow light 25 is shown for illustrative purposes as being effectively zero or parallel with the normal 68 of the display 12. The vertically narrow light 25, however, may effectively be emitted from the prisms 58 relative to the normal 68 in a non-parallel manner, i.e., with an angle θ2 greater than zero. Returning to FIG. 1, the normal 68 may be defined as a line or a vector perpendicular to the surface 28 of the display 12, a horizontal axis 70 may be defined from side-to-side across the display 12, and a vertical axis 72 may be define top-to-bottom across the display 12.

Figure 4:
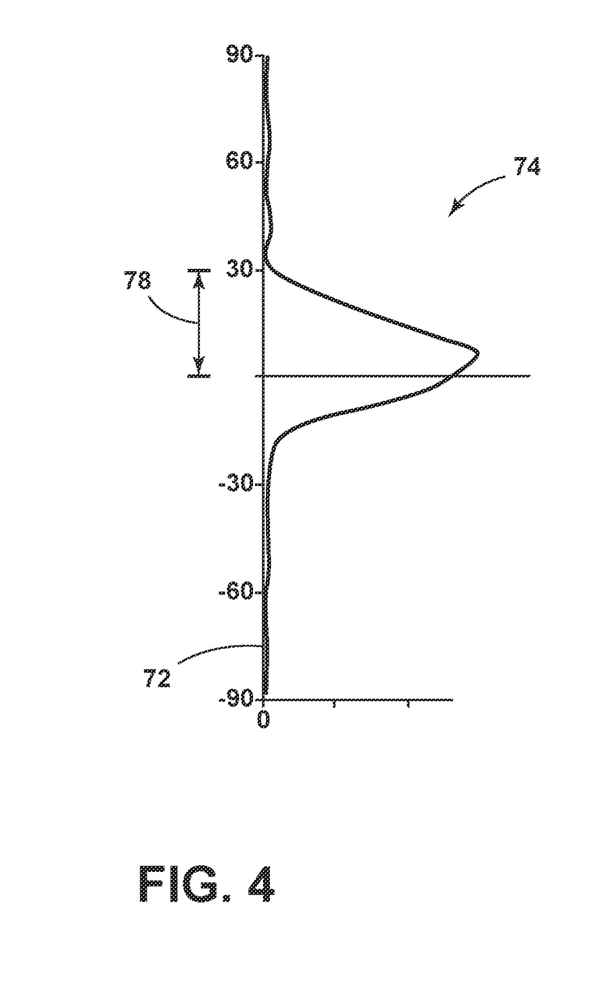
FIG. 4 illustrates a schematic diagram of a vertical luminance profile for the display in accordance with one non-limiting aspect of the present disclosure.
Figure 5:
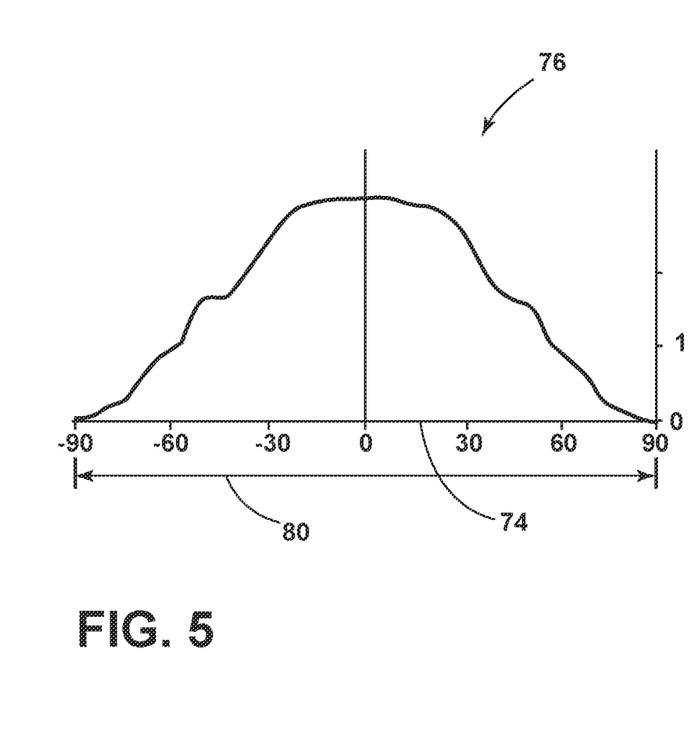
FIG. 5 illustrates a schematic diagram of a horizontal luminance profile for the display in accordance with one non-limiting aspect of the present disclosure.

FIG. 4 illustrates a schematic diagram of a vertical luminance profile 74 for the display 12 in accordance with one non-limiting aspect of the present disclosure. FIG. 5 illustrates a schematic diagram of a horizontal luminance profile 76 for the display 12 in accordance with one non-limiting aspect of the present disclosure. The vertical luminance profile 74 may be narrower than the horizontal luminance profile 76, optionally with the vertical luminance profile 74 having a vertical cutoff angle 78 of +/−30 degrees and the horizontal luminance profile 76 having a horizontal cutoff angle 80 approaching +/−90 degrees. It may be advantageous for the horizontal cutoff angle 80 to be as large as possible in order to facilitate broadening output of the display 12 under certain circumstances and it may be advantageous in other circumstances to narrow the horizontal cutoff angle 80. The horizontal cutoff angle 80 may be less relevant to producing reflections off of the windshield 18 than the vertical cutoff angle 78, and as such, the present disclosure predominately describes the direction changing element 54 being configured to manage the vertical cutoff angle 78 to avoid producing reflections off of the windshield 18.

Figure 6:
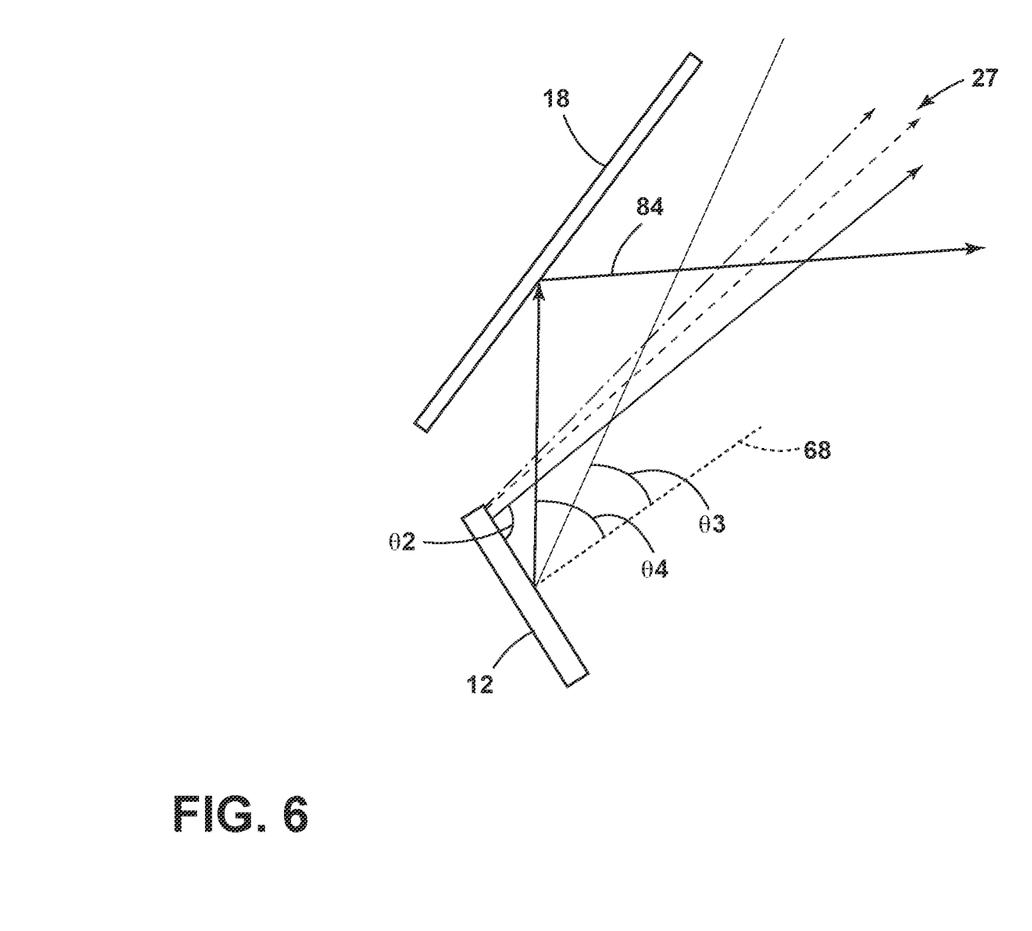
FIG. 6 illustrates a schematic diagram of an exemplary orientation of the display relative to a windshield in accordance with one non-limiting aspect of the present disclosure.

The cutoff angle 78 of +/−30 degrees is presented for non-limiting purposes as the present disclosure fully contemplates configuring the prisms 58 being configured to facilitate other cutoff angles 78 and/or to provide selectable cutoff angles 78. The cutoff angle 78 may be predicated or dictated according to spatial relationship between the display 12 and the windshield 18 or the display 12 another object towards which reflections may be avoided, such that the cutoff angle 78 may need to be more or less depending on the orientation of the display 12 relative to the windshield 18. The prisms 58 may be correspondingly shaped and configured to facilitate other cutoff angle 78. FIG. 6 illustrates a schematic diagram of an exemplary orientation of the display 12 relative to the windshield 18 in accordance with one non-limiting aspect of the present disclosure. The vertically narrow light 25 emitted from different locations of the display 12 may be generated according to the output angle θ2 so as to ensure the vertically narrow light 25 emits within a safe viewing cone θ3.

The safe viewing cone θ3 may correspond with a vertical luminance profile 74 that is effectively unable to reflect of the windshield 18, which in the illustrated configuration is shown to correspond with +/−30 degrees. The vertical cutoff angle 78 of the vertically narrow light 25 may be configured to be less than a reflection angle θ4. The reflection angle θ4 may correspond with an angle defined relative to the normal at which a windshield reflection 84 may be produced within the windshield 18. The optically transparent direction changing element 54 may configured in the manner described herein for statically directing the collimated light 42 to the vertically narrow light 25 such that the vertical cutoff angle 78 thereof less than the reflection angle θ4 whereby the vertically narrow light 25 may be operable with the display 12 to produce the optical signal 27 without the windshield reflections. The reflection angle θ4 is illustrated for non-limiting purposes with respect to generating reflections off of the windshield 18 as the reflection angle θ4 may vary and be dependent on a relative angle of the normal 68 to the surface upon which reflections are undesirable. The reflection angle θ4, and thereby the cutoff angle 78, may differ depending on the spatial relationship between the display 12 and the surface intended to be devoid of reflections.

Figure 7:
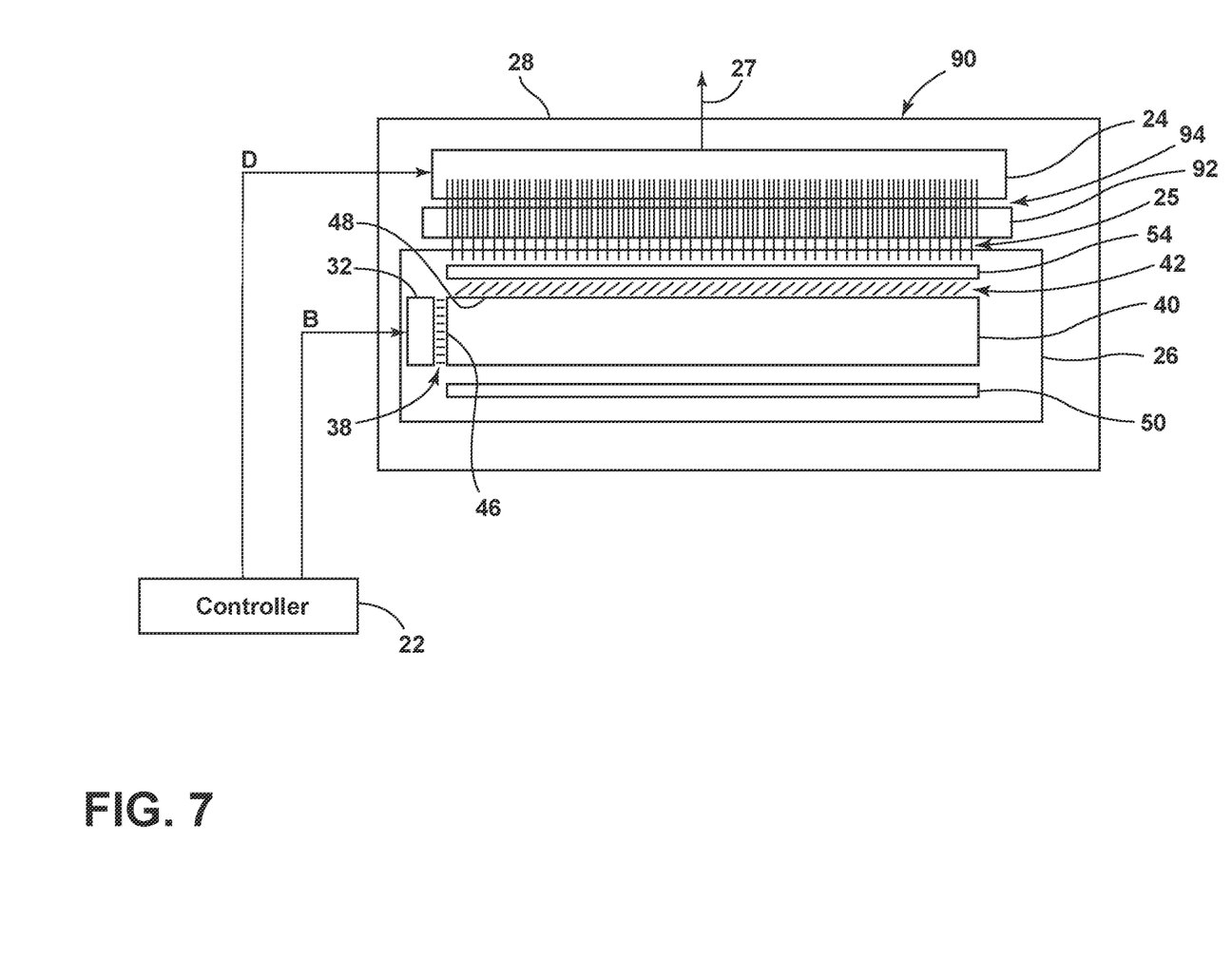
FIG. 7 illustrates a schematic diagram of another display in accordance with one non-limiting aspect of the present disclosure.

FIG. 7 illustrates a schematic diagram of another display 90 in accordance with one non-limiting aspect of the present disclosure. The display 90 may be similar to the display 12 described with respect to FIG. 2, with the addition of a diffuser 92 disposed between the transmissive display element 24 and the backlight 26. The diffuser 92 may be a passive diffuser configured to spatially spread the vertically narrow light 25 emitted from the backlight 26 to a spread light 94 whereby the spread light 94 may emit towards the transmissive display element 24. The spread light 94 may include a spread angle matching the output angle θ2 from the backlight 26 such that the spread light 94 may have a matching vertical and/or horizontal luminance profile 74, 76 to that described above with respect to FIG. 2, optionally with light 94 appearing to be more spatially spread. The diffuser 92 may optionally be an active diffuser, such as but not necessarily limited to a diffuser capable of directing or controlling light passing therethrough as a function of an electric field arranging liquid crystal. The passive diffuser, however, may be preferred based on having a lower cost and lower complexity.

As supported above, the backlight 26 contemplated by the present disclosure may be used with multiple display 12 configurations to generate a vertically narrow light 25 for purposes of avoiding producing reflections. The direction changing element 54, i.e., the prisms 58, may be fixed, immoveable, or unchangeable elements beneficial in directing the collimated light 42 and producing the vertically narrow light 25 without unduly wasting or rendering the collimated light 42 unusable. The direction changing element 54 may be optically transparent such that most, if not substantially an entirety, of the collimated light 42 received thereat is passed through to the transmissive display element 24. This relatively high transmissibility of the vertically narrow light 25 to the transmissive display element 24 may minimize power consumption and maximize power efficiency, at least with respect louvres, shutters. or other blocking elements, or films, configured from blocking light from passing through to the transmissive display element 24 or from passing from the transmissive display element 24 outward. The backlight 26 of the present disclosure may also be beneficial in enabling the display 12 to be positioned within the dashboard 14 without requiring the dashboard 14 to include an overhang or other cover over a portion of the display 12 or otherwise included features for hiding the display 12 from the windshield 18, i.e., the backlight 26 may enable the displays 12 to be coplanar with and/or unobstructed by the dashboard 14 to provide an aesthetically pleasing look while also avoiding windshield reflections.

The terms "comprising", "including", and "having" are inclusive and therefore specify the presence of stated features, steps, operations, elements, or components, but do not preclude the presence or addition of one or more other features, steps, operations, elements, or components. Orders of steps, processes, and operations may be altered when possible, and additional or alternative steps may be employed. As used in this specification, the term "or"

includes any one and all combinations of the associated listed items. The term "any of" is understood to include any possible combination of referenced items, including "any one of" the referenced items. "A", "an", "the", "at least one", and "one or more" are used interchangeably to indicate that at least one of the items is present. A plurality of such items may be present unless the context clearly indicates otherwise. All numerical values of parameters (e.g., of quantities or conditions), unless otherwise indicated expressly or clearly in view of the context, including the appended claims, are to be understood as being modified in all instances by the term "about" whether or not "about" actually appears before the numerical value. A component that is "configured to" perform a specified function is capable of performing the specified function without alteration, rather than merely having potential to perform the specified function after further modification. In other words, the described hardware, when expressly configured to perform the specified function, is specifically selected, created, implemented, utilized, programmed, and/or designed for the purpose of performing the specified function.

While various embodiments have been described, the description is intended to be exemplary, rather than limiting and it will be apparent to those of ordinary skill in the art that many more embodiments and implementations are possible that are within the scope of the embodiments. Any feature of any embodiment may be used in combination with or substituted for any other feature or element in any other embodiment unless specifically restricted. Accordingly, the embodiments are not to be restricted except in light of the attached claims and their equivalents. Also, various modifications and changes may be made within the scope of the attached claims. Although several modes for carrying out the many aspects of the present teachings have been described in detail, those familiar with the art to which these teachings relate will recognize various alternative aspects for practicing the present teachings that are within the scope of the appended claims. It is intended that all matter contained in the above description or shown in the accompanying drawings shall be interpreted as illustrative and exemplary of the entire range of alternative embodiments that an ordinarily skilled artisan would recognize as implied by, structurally and/or functionally equivalent to, or otherwise rendered obvious based upon the included content, and not as limited solely to those explicitly depicted and/or described embodiments.

What is claimed is:

1. A backlighting system for preventing a display from producing windshield reflections within a vehicle, the windshield reflections resulting from the display emitting an optical signal at a vertical angle greater than a reflection angle, comprising:
    an edge light source configured for generating an edge light;
    a collimated lightguide configured for collimating the edge light to a collimated light; and
    a direction changing element statically configured for directing the collimated light to a vertically narrow light having a vertical cutoff angle less than the reflection angle, the vertically narrow light operable with the display to produce the optical signal without the windshield reflections;
    wherein the direction changing element is comprised of an optically transparent material having a textured or shaped surface configured for directing the collimated light in a fixed manner toward the display without physically blocking the collimated light from passing therethrough.

2. The backlighting system according to claim 1, wherein:
    the direction changing element includes a plurality of prisms configured for directing the collimated light to the vertically narrow light.

3. The backlighting system according to claim 2, wherein:
    the prisms are triangular in shape and include a receiving face configured for receiving the collimated light, a reflecting face configured for reflecting the collimated light received from the receiving face, and an output face configured for emitting the vertically narrow light towards the display.

4. The backlighting system of claim 3, wherein:
    the prisms are immovably attached to or included as part of a base of the direction changing element.

5. The backlighting system according to claim 4, wherein:
    the receiving face is configured for refracting the collimated light prior to the collimated light reaching the reflecting face.

6. The backlighting system according to claim 4, wherein:
    the receiving face is angled at a receiving angle defined relative to a normal of the display; and
    the reflecting face is angled at a reflecting angle.

7. The backlighting system according to claim 6, wherein:
    the receiving face cooperates with the reflecting face to constrain the vertically narrow light to an output angle less than the reflection angle.

8. The backlighting system according to claim 7, wherein:
    the collimated lightguide is configured for emitting the collimated light at a collimated angle substantially across an entirety of an output surface thereof.

9. The backlighting system according to claim 8, wherein:
    the output surface of the collimated lightguide is parallel to the display and perpendicular to the normal.

10. The backlighting system according to claim 9, wherein:
    a surface area of the output surface is greater than a surface area of an input to the collimated lightguide receiving the edge light.

11. The backlighting system according to claim 4, further comprising:
    a diffuser disposed between the direction changing element and the display, the diffuser configured for spreading the vertically narrow light to a spread light to provide uniformity improvement.

12. The backlighting system according to claim 1, wherein:
    the vertical narrow light is operable with the display to emit the optical signal with a vertical luminance profile less than a horizontal luminance profile.

13. The backlighting system according to claim 1, wherein:
    the direction changing element is characterized by the absence of a blocking feature.

14. A backlighting system for a display, comprising:
    an edge light source configured for generating an edge light;
    a collimated lightguide configured for collimating the edge light to a collimated light; and
    a plurality of triangularly shape prisms statically configured for directing the collimated light to a vertically narrow light, the prisms configured to emit the vertically narrow light at a vertical cutoff angle defined relative to a normal of the display;

a direction changing element configured for directing the collimated light in a fixed manner toward the display without physically blocking the collimated light from passing therethrough.

15. The backlight system according to claim 14, wherein:
the prisms include a receiving face configured for receiving the collimated light, a reflecting face configured for reflecting the collimated light received from the receiving face, and an output face configured for emitting the vertically narrow light towards the display.

16. The backlighting system according to claim 15, wherein:
the direction changing element is comprised of an optically transparent material configured for directing the collimated light in the fixed manner toward the display without physically blocking the collimated light from passing therethrough.

17. A vehicle, comprising:
a windshield;
a display disposed rearward and below at least a portion of the windshield, the display producing windshield reflections when emitting an optical signal at a vertical angle greater than a reflection angle; and
a backlight system configured for preventing the display from producing the windshield reflections, the backlighting system comprising:
a collimated lightguide configured for collimating an input light to a collimated light; and
an optically transparent direction changing element configured for statically directing the collimated light to a vertically narrow light having a vertical cutoff angle less than the reflection angle, the vertically narrow light operable with the display to produce the optical signal without the windshield reflections;
wherein the optically transparent direction changing element is characterized by the absence of a blocking feature.

18. The vehicle according to claim 17, wherein:
the optically transparent direction changing element includes a textured or shaped surface configured for statically directing the collimated light in a fixed manner toward the display without physically blocking the collimated light from passing therethrough.

19. The vehicle according to claim 17, wherein:
the optically transparent direction changing element includes a plurality of prisms configured for statically directing the collimated light in a fixed manner toward the display without physically blocking the collimated light from passing therethrough.

* * * * *